United States Patent [19]

Maier

[11] Patent Number: 4,514,127
[45] Date of Patent: Apr. 30, 1985

[54] ROUND BALE UNROLLER

[76] Inventor: Joseph W. Maier, Box 93, Paradise Hill, Saskatchewan, Canada, S0M 2G0

[21] Appl. No.: 515,994

[22] Filed: Jul. 22, 1983

[30] Foreign Application Priority Data

Jan. 6, 1982 [CA] Canada .................................. 393648

[51] Int. Cl.³ .......................................... A01D 87/12
[52] U.S. Cl. .................................. 414/24.6; 16/86 C; 242/86.5 R; 414/665; 414/705; 414/785; 414/786
[58] Field of Search ............... 414/24.5, 24.6, 665, 414/666, 669, 670, 684, 685, 697, 705, 785, 786, 911; 242/86.5 R, 86.52; 16/86 C

[56] References Cited

U.S. PATENT DOCUMENTS

| | | | |
|---|---|---|---|
| 2,639,458 | 5/1953 | Travis | 16/86 C X |
| 2,721,668 | 10/1955 | Elsner | 414/665 |
| 2,774,498 | 12/1956 | Cordes et al. | 414/665 |
| 2,914,270 | 11/1959 | Parker et al. | 242/86.5 R |
| 3,498,485 | 3/1970 | Godbersen | 414/697 |
| 3,995,594 | 12/1976 | Rose | 414/24.5 X |
| 4,120,405 | 10/1978 | Jones et al. | 414/723 X |
| 4,249,842 | 2/1981 | Johnson | 414/24.6 X |
| 4,306,825 | 12/1981 | Yilit | 414/24.5 |

Primary Examiner—Leslie J. Paperner
Attorney, Agent, or Firm—Stanley G. Ade

[57] ABSTRACT

Round bales require to be unrolled in order that the contents are available to the cattle and usually they are unrolled by mounting same in a frame and then towing the frame behind a tractor. The present device is mounted at the front of a tractor and includes a frame with two spaced and parallel prongs for spearing the bale in order to move it in position from a storage area. When in the desired location, the prongs are withdrawn and one of the prongs is engaged axially with the bale. The prong is then lowered until the periphery of the bale engages the ground at which time it is unlatched. The tractor is driven forward and to one side thus moving the bale and prong through approximately 90° so that the axis of the bale is perpendicular to the direction of travel. Driving the tractor forward unrolls the bale raising the frame which is tilted forwardly, causes the prong to swing forwardly and latch automatically.

19 Claims, 6 Drawing Figures

U.S. Patent
Apr. 30, 1985
4,514,127
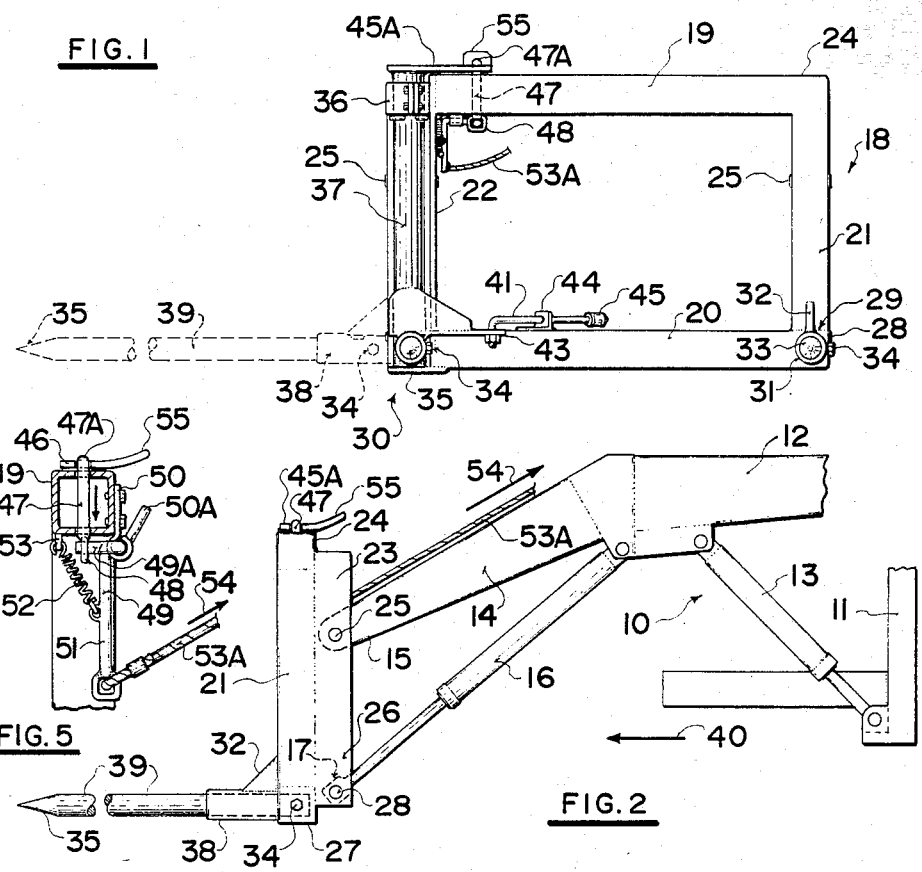
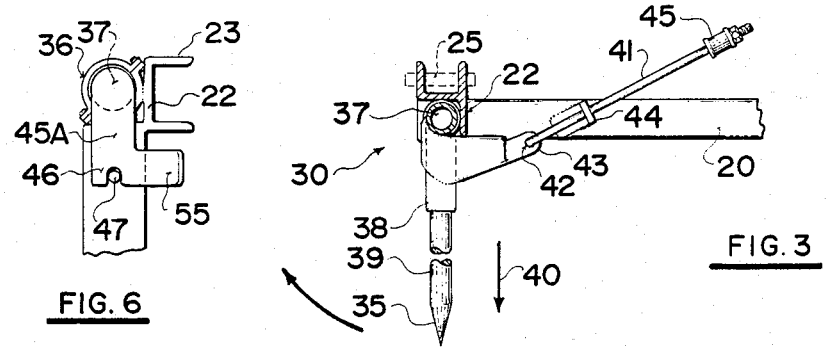
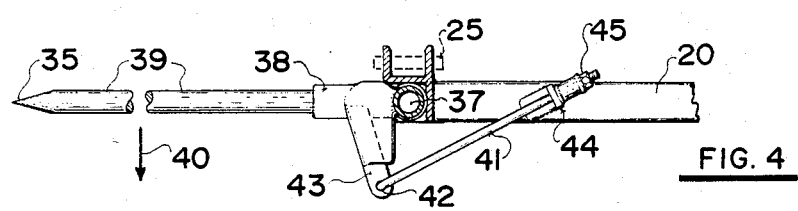

ROUND BALE UNROLLER

BACKGROUND OF THE INVENTION

This invention relates to new and useful improvements in round bale handling and unrolling devices.

Due to the extreme weight of round bales, they are difficult to unroll when being readied for use, it being understood that such bales have to be unrolled in order to make the contents available as feed for cattle.

One such device for unrolling bales consists of a wheeled frame with a transverse spindle upon which the bale is mounted whereupon the end of the bale is anchored and the wheeled frame is pulled forward by a tractor or the like thus unrolling the bale. However, it is time consuming and difficult to move the bale from a storage area and then mount same on the spindle whereupon the spindle and bale have to be mounted in the frame for rotation as the bale is being unrolled.

SUMMARY OF THE INVENTION

The present device overcomes these disadvantages by providing a relatively simple device adapted to be used with the fork lift mechanism mounted on the front of a tractor. The device is designed to move a bale from a storage area or pile whereupon it may be disengaged and re-engaged axially and positioned so that forward movement of the tractor unrolls the bale readily and easily.

In accordance with the invention there is provided a round bale unrolling device for attachment to a fork lift mechanism on a tractor or the like; comprising in combination a substantially rectangular frame, means on the rear side of said frame operatively mounting said frame to the fork lift mechanism for raising and lowering the frame and tilting said frame around a substantially horizontal mounting axis, at least one round bale axis engaging member extending from adjacent the base of said frame and means mounting said member by the inner end thereof for pivotal movement from a forwardly extending position from said frame to a sideways extending position substantially 90° from said forward position.

In accordance with another aspect of the invention a method is provided for unrolling a round bale consisting of the steps of engaging said bale axially, with a bale engaging member, unlatching said member, engaging said bale with the ground by the periphery thereof, moving said member and said bale horizontally, around a vertical axis located at the inner end of said member, and through approximately 90°, and then moving said engaging member and said bale in a direction to unroll said bale from said bale engaging member.

Another advantage of the invention is to provide a device which is readily attached and detached from a conventional fork lift mechanism mounted on the front end of a tractor.

A still further advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a front elevation of the device per se.

FIG. 2 is a side elevation of FIG. 1 showing same mounted upon the front portion of a conventional fork lift attachment assembly.

FIG. 3 is a fragmentary top plan view showing the bale engaging member in the forward position.

FIG. 4 is a view similar to FIG. 1 but showing the bale engaging member in the sideways position.

FIG. 5 is a fragmentary, partially sectioned inner end view of the latching mechanism.

FIG. 6 is a fragmentary, top plan view of FIG. 5.

In the drawings like characters of reference indicate corresponding parts in the different figures.

DETAILED DESCRIPTION

Proceeding therefore to describe the invention in detail, reference character 10 illustrates, partially schematically, the front portion of a conventional fork lift assembly normally attached to the front of a tractor (not illustrated) and including framework 11, upper lifting frame 12, and main raising and lowering piston and cylinder assembly 13, it being understood that a source of power for the lifting assembly is derived from the tractor.

Member 12 includes an upper downwardly extending member 14, one upon each side thereof (one only being shown) which terminates in an apertured end 15 by which it may be attached to the upper end of a fork lift or bucket assembly (not shown). Reference character 16 shows one of a pair of piston and cylinder assemblies operatively extending from the upper frame member 12, downwardly and forwardly and terminating in a piston rod apertured end 17 which normally is connected to the fork lift or bucket assembly spaced vertically below the end 15 of the member 14. All of this structure is conventional.

The invention collectively designated 18 consists of a substantially rectangular frame including an upper horizontal member 19, a lower spaced and parallel horizontal member 20 and vertically situated side members 21 and 22 extending between the ends of the members 19 and 20 thus forming the rigid frame.

Plates 23 are situated on the vertical members 21 and 22 on the rear sides 24 thereof so that pivot pins 25 may be engaged through apertures in these lug plates and through the aforementioned apertured ends 15 of the upper frame member portion 14.

The fork ends 17 of the piston rods are pivotally engaged through further apertures in plates 23 at 26 adjacent the lower ends 27 thereof and substantially vertically below the pins 25 with further pivot pins 28 connecting ends 17 to plates 23 as clearly shown. Alternatively, pairs of lugs may be provided extending from the rear of vertical members 21 and 22.

This means that actuation of the piston and cylinder assemblies 13 will raise and lower the frame and actuation of the piston and cylinder assemblies 16 will tilt the frame around the horizontal axis defined by the pivot pins 25.

Round bale engaging members are mounted upon the front of the frame adjacent the lower outer corners thereof and in the preferred embodiment, one of these members collectively designated 29 is fixed and the other of these members collectively designated 30, is pivoted.

The fixed bale engaging member consists of a sleeve 31 secured as by welding or the like to the junction of the vertical member 21 and the lower horizontal member 20 with a brace plate 32 extending between the sleeve and the vertical member 21 to provide support.

A substantially cylindrical prong or rod 33 engages within the sleeve and may be detachably secured by means of a bolt 34. The distal end 35 of this member or prong is pointed to facilitate engagement with a bale as will hereinafter be described.

The other of the bale engaging members 30 is situated adjacent the junction of the other vertical member 22 and the lower horizontal member 20 and this particular bale engaging member is pivotally mounted. In this connection, bearing sleeves 36 are secured and supported to the vertical member 22 and a spindle 37 is journalled for rotation within this bearing member.

A sleeve 38 is secured to and extends from the base of the lower sleeve 36 and a bale engaging member or prong 39, similar to member 33, is secured in said sleeve by means of a bolt 34. This member is also cylindrical and provided with a sharpened or pointed end 35.

The pivotal mounting of this particular member 30 enables the member 39 to be situated in a position shown in FIGS. 1 and 3 in which the two members 33 and 39 extend forwardly in spaced and parallel relationship. It also permits the member 39 to be swung through approximately 90° to the position shown in FIG. 4 so that it lies substantially normal to the direction of the member 33 or, the direction of travel of the assembly when installed, which is indicated by arrow 40.

Means are provided to control the amount of swing from the forwardly extending position of member or assembly 30 and the sideways position shown in FIG. 4, said means taking the form of a check link 41 which consists of a rod having a downturned end 42 pivotally engaging within an apertured lug 43 extending from the aforementioned sleeve 38. The link or rod 41 slidably engages an apertured plate 44 secured to the upper surface of the lower horizontal member 20 of the frame and an enlarged end 45 is provided on the distal end of the link or rod 41 preventing same from disengaging from the plate 44. It will be seen by reference to FIG. 4, that the enlarged end 45 engages plate 44 when the member 39 is in the fully extended sideways position illustrated therein.

Also illustrated is a latching mechanism for the assembly 30 consisting of a latch plate 45A secured to the upper end of the spindle 36 and having a fork or bifurcated distal end 46. A latch pin 47 is journalled in the upper member 19 of the frame for vertical movement thereto with the upper end 47A normally extending above the upper surface of the member 19 and, when the prong 39 is in the forwardly extending position as illustrated in FIGS. 1 and 3, engaging with the bifurcated end of the latch plate 45A thus locking the member 30 in the forward position spaced and parallel to the member 29.

The lower end of pin 47 is provided with apertured means 48 engageable by a lever 49. This lever includes the angulated upper end portion 49A extending rearwardly from the apertured end 48 and normally engaging pivoted bracket 50 attached to the rear side of the frame member 19 thus acting as a bearing. The portion then extends forwardly and then downwardly to the actuating portion 51. A small tension spring 52 extends between the portion 51 and an anchor point 53 on the underside of the frame member 19 and normally maintains the portion 51 in the position illustrated in FIG. 5 thus maintaining the pin 47 in the engaged position shown in FIGS. 1 and 2. A rope or cable 53A extends from the lower end of the portion 51 to a convenient location in the cab of the vehicle (not illustrated) which, when pulled in the direction of arrow 54, pivots the actuating lever 49 so that the portion 51 also moves in the direction of arrow 54 thus withdrawing the pin 47 downwardly and disengaging the upper end 47A, from the latch plate 45 and thus releasing the assembly 30 from its locked position so that it can pivot as will hereinafter be described. A lever 50A extends upwardly from the portion 49A and engages the frame 19 and acts as a stop member to limit the movement of pin 47.

In operation, the two members or assemblies 29 and 30 are positioned in the spaced and parallel forwardly engaging position, with member 30 locked by the latching mechanism so that they may engage a round bale from a storage area, and by manipulating the piston and cylinder assemblies 13 and 16, may be moved by the tractor to the desired location for unrolling. The bale is then disengaged from the members 29 and 30 and the tractor and the fork lift or bucket assembly together with the invention 18, is manoeuvered so that prong or member 39 of the assembly 30 engages the bale axially from one end thereof.

The latching mechanism is unlatched whereupon the vehicle is moved forwardly, steering slightly to the left, so that the engagement of the bale with the ground causes the bale and the assembly 30 to swing around the vertical axis of the shaft 36, through approximately 90° and to the position in FIG. 4 where the prong 39 together with the bale, is situated perpendicular to the direction of travel 40 so that when the vehicle is straightened and again moved forwardly, the forward movement will unroll the bale which rotates upon the member 39 with the piston and cylinder assemblies 13 and 16 being released so that the weight of the bale maintains the periphery thereof in contact with the ground as the diameter of the bale decreases. The check link 41 prevents the assembly 30 from pivoting beyond the sideways movement perpendicular to the direction of travel.

Alternatively, the piston and cylinder assemblies 13 and 16 may be actuated to maintain the periphery of the bale in contact with the ground with the desired pressure thus ensuring that the unrolling action continues.

Once the bale has been unrolled, the frame together with members 29 and 30, are moved to the forwardly tipped position by retraction of piston and cylinder assemblies 16 so that the assembly 30 swings forwardly by gravity to the position shown in FIG. 1. As the latch plate rotates with the shaft 37, during this manoeuver, it will be noted that the upturned curve rear extension 55 of the latch plate, rides over the extending upper end 47A of the pin pressing same downwardly against pressure of spring 52 until the upper end 47A enters the fork or bifurcated end 46 whereupon the spring moves it upwardly into the latched position illustrated.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A round bale unrolling device for attachment to a fork lift mechanism on a tractor or the like; comprising in combination a substantially rectangular frame, means on the rear side of said frame operatively mounting said frame to the fork lift mechanism for raising and lowering the frame and tilting said frame around a substantially horizontal mounting axis, at least one round bale axis engaging member extending from adjacent the base of said frame and means mounting said member by the inner end thereof for pivotal movement from a forwardly extending position from said frame to a sideways extending position substantially 90° from said forward position position and vice versa, the tilting of said frame around a substantially horizontal axis, moving said frame from an upwardly inclined position to a downwardly inclined position and vice versa, the tilting of said frame fromthe upwardly inclined position to the downwardly inclined position, swinging said round bale engaging member from the sideways extending position to the forwardly extending position, by gravity.

2. The device according to claim 1 in which said frame includes an upper and lower spaced and parallel horizontal member and a pair of spaced and parallel vertical members extending therebetween adjacent the ends thereof, said means mounting said frame to the fork lift assembly being situated on said vertical members, and at least two bale engaging members mounted on said frame, one each adjacent the junction of the lower ends of said vertical members and the outer ends of said lower horizontal member, at least one of said bale engaging members being mounted for pivotal movement as aforesaid.

3. The device according to claim 1 in which said means mounting said bale axis engaging member by one end thereof includes a vertical bearing support mounted on said frame, said bale axis engaging member extending from the base thereof.

4. The device according to claim 2 in which said means mounting said bale axis engaging member by one end thereof includes a vertical bearing support mounted on said frame, said bale axis engaging member extending from the base thereof.

5. The device according to claim 3 in which said bale axis engaging member is mounted at one end of said frame adjacent the lower corner thereof.

6. The device according to claim 4 in which said bale axis engaging member is mounted at one end of said frame adjacent the lower corner thereof.

7. The device according to claim 1 which includes means cooperating between said bale axis engaging member and said frame to limit the pivotal movement of said bale axis engaging member, said last mentioned means including a check link pivotally secured by one end thereof to said bale axis engaging member adjacent the inner end thereof, an apertured check link engaging means on said frame, said check link slidably engaging said check link engaging means, and means on the distal end of said check link engaging said check link engaging means when said bale axis engaging member is in the fully extended sideways position.

8. The device according to claim 2 which includes means cooperating between said bale axis engaging member and said frame to limit the pivotal movement of said bale axis engaging member, said last mentioned means including a check link pivotally secured by one end thereof to said bale axis engaging member adjacent the inner end thereof, an apertured check link engaging means on said frame, said check link slidably engaging said check link engaging means, and means on the distal end of said check link engaging said check link engaging means when said bale axis engaging member is in the fully extended sideways position.

9. The device according to claim 3 which includes means cooperating between said bale axis engaging member and said frame to limit the pivotal movement of said bale axis engaging member, said last mentioned means including a check link pivotally secured by one end thereof to said bale axis engaging member adjacent the inner end thereof, an apertured check link engaging means on said frame, said check link slidably engaging said check link engaging means, and means on the distal end of said check link engaging said check link engaging means when said bale axis engaging member is in the fully extended sideways position.

10. The device according to claim 4 which includes means cooperating between said bale axis engaging member and said frame to limit the pivotal movement of said bale axis engaging member, said last mentioned means including a check link pivotally secured by one end thereof to said bale axis engaging member adjacent the inner end thereof, an apertured check link engaging means on said frame, said check link slidably engaging said check link engaging means, and means on the distal end of said check link engaging said check link engaging means when said bale axis engaging member is in the fully extended sideways position.

11. The device according to claim 5 which includes means cooperating between said bale axis engaging member and said frame to limit the pivotal movement of said bale axis engaging member, said last mentioned means including a check link pivotally secured by one end thereof to said bale axis engaging member adjacent the inner end thereof, an apertured check link engaging means on said frame, said check link slidably engaging said check link engaging means, and means on the distal end of said check link engaging said check link engaging means when said bale axis engaging member is in the fully extended sideways position.

12. The device according to claim 6 which includes means cooperating between said bale axis engaging member and said frame to limit the pivotal movement of said bale axis engaging member, said last mentioned means including a check link pivotally secured by one end thereof to said bale axis engaging member adjacent the inner end thereof, an apertured check link engaging means on said frame, said check link slidably engaging said check link engaging means, and means on the distal end of said check link engaging said check link engaging means when said bale axis engaging member is in the fully extended sideways position.

13. The device according to claim 1 which includes detachable latching means for said bale axis engaging member, normally latching said bale axis engaging member in the forwardly extending position from said frame, said last mentioned means including a latch plate secured to said bale axis engaging member, a latch pin mounted in said frame and normally engaging said member and latching same as aforesaid, and release means operatively connected to said pin for selectively disengaging said pin from said latch plate thereby releasing said bale axis engaging member.

14. The device according to claim 2 which includes detachable latching means for said bale axis engaging member, normally latching said bale axis engaging member in the forwardly extending position from said frame, said last mentioned means including a latch plate secured to said bale axis engaging member, a latch pin mounted in said frame and normally engaging said member and latching same as aforesaid, and release means operatively connected to said pin for selectively disengaging said pin from said latch plate thereby releasing said bale axis engaging member.

15. The device according to claim 3 which includes detachable latching means for said bale axis engaging member, normally latching said bale axis engaging member in the forwardly extending position from said frame, said last mentioned means including a latch plate secured to said bale axis engaging member, a latch pin mounted in said frame and normally engaging said member and latching same as aforesaid, and release means operatively connected to said pin for selectively disengaging said pin from said latch plate thereby releasing said bale axis engaging member.

16. The device according to claim 5 which includes detachable latching means for said bale axis engaging member, normally latching said bale axis engaging member in the forwardly extending position from said frame, said last mentioned means including a latch plate secured to said bale axis engaging member, a latch pin mounted in said frame and normally engaging said member and latching same as aforesaid, and release means operatively connected to said pin for selectively disengaging said pin from said latch plate thereby releasing said bale axis engaging member.

17. The device according to claim 7 which includes detachable latching means for said bale axis engaging member, normally latching said bale axis engaging member in the forwardly extending position from said frame, said last mentioned means including a latch plate secured to said bale axis engaging member, a latch pin mounted in said frame and normally engaging said member and latching same as aforesaid, and release means operatively connected to said pin for selectively disengaging said pin from said latch plate thereby releasing said bale axis engaging member.

18. The device according to claim 10 which includes detachable latching means for said bale axis engaging member, normally latching said bale axis engaging member in the forwardly extending position from said frame, said last mentioned means including a latch plate secured to said bale axis engaging member, a latch pin mounted in said frame and normally engaging said member and latching same as aforesaid, and release means operatively connected to said pin for selectively disengaging said pin from said latch plate thereby releasing said bale axis engaging member.

19. A method of unrolling a round bale consisting of the steps of engaging said bale axially, with a bale engaging member attached to a frame, unlatching said member, engaging said bale with the ground by the periphery thereof, moving said member and said bale horizontally, around a vertical axis located at the inner end of said member, and through approximately 90°, then moving said bale engaging member and said bale in a direction to unroll said bale from said bale engaging member, and then tilting said frame forwardly and then raising said frame, whereby said member swings forwardly by gravity through approximately 90° and automatically latching said member in this position.

* * * * *